Figure 1:
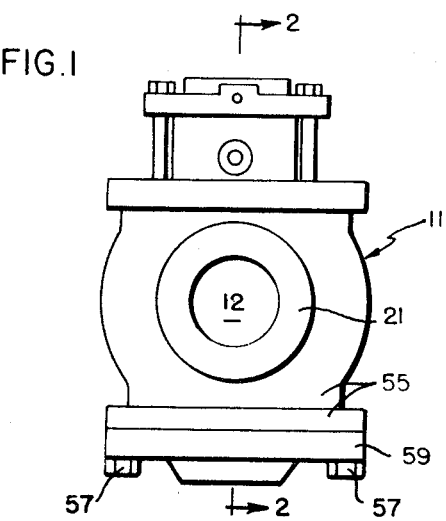

United States Patent [19]
West

[11] 3,741,245
[45] June 26, 1973

[54] BLOCK AND VENT VALVE

[76] Inventor: Benjamin W. West, 237 La Espiral, Orinda, Calif. 94563

[22] Filed: June 9, 1971

[21] Appl. No.: 151,466

[52] U.S. Cl.............. 137/596.18, 137/630, 92/62
[51] Int. Cl............................................. F16k 11/00
[58] Field of Search............. 137/596.17, 596.18, 137/596.1, 596, 625.25, 625.27; 251/63.5, 63.6, 77, 63.4, 62; 91/167; 92/62, 63, 65

[56] References Cited
UNITED STATES PATENTS
1,926,076   9/1933   Whalen............................ 92/62 X
3,057,205  10/1962   Howard et al. .................. 92/63 X FOREIGN PATENTS OR APPLICATIONS
483,835   4/1938   Great Britain.................... 137/630

Primary Examiner—Henry T. Klinksiek
Assistant Examiner—Robert J. Miller
Attorney—Fitch, Even, Tabin & Luedeka

[57] ABSTRACT

A valve assembly is described of the so-called block and vent type wherein the valve is normally closed with the downstream side vented. When a pilot pressure is applied, it first closes the vent and then opens the valve partially. On application of a second pilot signal from another source or from a suitable time delay network, the valve opens fully. On release of the pilot pressures, the valve closes first and then opens the downstream vent.

2 Claims, 2 Drawing Figures

PATENTED JUN 26 1973

3,741,245

INVENTOR
BENJAMIN W. WEST

Fitch, Even, Tabin & Luedeka
ATTYS.

3,741,245

BLOCK AND VENT VALVE

This invention relates to valve assemblies and, more particularly, to an improved shut off valve assembly of the so-called block and vent type.

Shut off valve assemblies of the so-called block and vent type operate to open or close a main pressurized line and, when closed, to vent the downstream side. The valves are designed to be normally closed with the downstream side vented. When a pilot pressure is applied for operating the valve, it first closes the vent and then opens the valve. On release of the pilot pressure, the valve closes first and then opens the downstream vent.

An important application of shut off valve assemblies of the block and vent type is in connection with natural gas engines. The valves may be used to control the flow of fuel gas to the engine during start up. During starting of natural gas engines, it is typically necessary that precise and automatic throttling of fuel gas be available to avoid overspeed or swamping of the engine. The reason precise throttling for natural gas engines during start up is required is that such engines are typically turbo-charged. At start up, however, the turbo-charger is improperly functioning because the engine is not operating at full speed and so a full gas supply will overload the combustion system. This will produce overspeed of the engine or will kill the engine by swamping it.

In order to provide precise throttling, prior art natural gas engine systems have often incorporated a second valve or regulator in series with the block and vent valves. Thus, although the block and vent valve opens, the second valve or regulator remains partially closed for a period of time sufficient to allow proper start up of the engine. The necessity for employing two valves in the gas supply line for a natural gas engine obviously increases the expense of the system. In addition, the presence of additional operating equipment introduces a further increase in unreliability.

It is an object of the present invention to provide an improved valve assembly.

Another object of the invention is to provide a valve assembly of the block and vent type which is capable of performing all the functions necessary for controlling fuel flow to a natural gas engine.

It is another object of the invention to provide a shut off valve of the block and vent type which opens in two steps in response to a pair of pilot signals, one time delayed.

Figure 2:
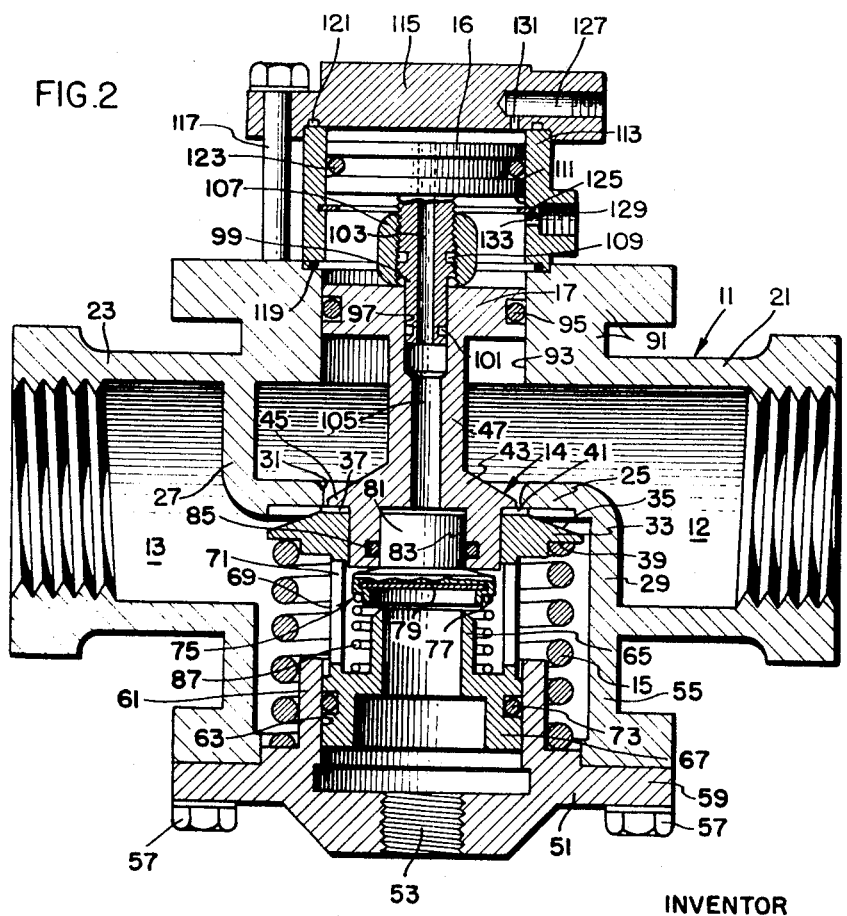

Other objects of the invention will become apparent to those skilled in the art from the following description, taken in connection with the accompanying drawings wherein:

FIG. 1 is an elevational view of a value assembly constructed in accordance with the invention; and FIG. 2 is a full section view taken along the line 2—2 of FIG. 1.

Very generally, the valve assembly of the invention comprises a housing 11 defining an inlet passage 12 and an outlet passage 13. A main valve member 14 is provided and main bias means 15 retain the main valve member in a position blocking the inlet passage from the outlet passage. Means 16 are provided responsive to a first pilot or control signal pressure for moving the main valve member a preselected distance to partially unblock the inlet passage from the outlet passage. Additional means 17 are provided responsive to a second pilot or control signal pressure in addition to the first control signal pressure to move the main valve member to a position whereat the inlet passage is fully unblocked from the outlet passage.

Referring now to FIG. 1, the illustrated valve comprises a housing 11. The housing 11 is provided with a pair of flanged cylindrical extensions 21 and 23. The extension 21 defines the inlet passage 12 and the extension 23 defines the outlet passage 13. The interior walls of the extensions 21 and 23 are threaded near the outer extremities of the sections for connection to the main line.

In order to provide a separation between the inlet passage 12 and the outlet passage 13, a barrier is provided separating the two passages. The barrier includes a planar central section 25 which lies along a portion of the axis common to the inlet and outlet passages. The barrier also includes a transverse section 27 joining the central section 25 to the inner wall of the outlet passage 13, and includes a transverse section 29 at the opposite end of the central section 25 joining the central section with the interior wall of the inlet passage 12. An orifice 31 is provided in the central section 25 communicating between the inlet passage 12 and the outlet passage 13.

The main valve member 14 maintains the orifice 31 normally blocked or closed, thus blocking the inlet passage 12 from the outlet passage 13. The main valve member 14 or poppet assembly is comprised of a poppet ring 33 having an annular frustoconical upper surface 35 terminating in an annular shelf 37. The underside of the poppet ring 33 is provided with an annular recess 39. The annular shelf 37 of the poppet ring 33 is provided with an annular seal 41. The annular seal 41 is biased against the underside of the central section 25 around the outer periphery of the orifice 31 by means of the main bias means or coil spring 15. The coil spring 15 biases the poppet ring upwardly, holding the annular seal 41 against the underside of the horizontal or central section 25 to seal the orifice 31.

The main valve member 14 also includes an upper portion 43. The upper portion 43 is secured to the annular poppet ring 33 and includes an annular shoulder 45 which secures the annular seal 41 against the annular shelf 37 of the poppet ring 33. The periphery of the shoulder 45 is such as to provide clearance between the upper portion 43 and the orifice 31. The upper surface of the upper portion 43 is frustoconical and terminates in a valve stem 47. A piston 17 is supported on the upper end of the valve stem 47 and comprises the means responsive to a second pilot or control signal pressure in addition to the first control signal pressure to move the main valve member 14 to a position whereat the inlet passage 12 is fully unblocked from the outlet passage 13. As will be explained below, the first or the second control signal pressure causes the piston 17 to move downwardly and thus move the main valve member 14 downwardly against the bias of the coil spring 15 such that the annular seal 47 is displaced downwardly from the orifice 31. This allows flow through the orifice 31 from the inlet passage 12 to the outlet passage 13. The extent of displacement of the seal 41 determines the flow through the orifice 31.

As mentioned above, with the main valve member 14 in the illustrated position, thus closing the orifice 31 and blocking the inlet passage 12 from the outlet passage 13, the outlet passage 13 is vented. In order to accomplish this, the housing 11 is provided with a lower cover 51 having a threaded vent opening 53 centrally thereof. The lower cover 51 is bolted to a downwardly extending flanged extension 55 of the housing 11 by bolts 57. The bottom plate 51 is provided with an annular flange 59 through which the bolts 57 pass, the flange 59 mating with the flange on the extension 55.

The inner side of the bottom plate 51 is provided with a cylindrical section 61 extending upwardly into the extension 55 of the housing 11. The coil spring 15 rests upon the upper surface of the bottom plate 51 between the outer wall of the cylindrical section 61 and the inner wall of the housing extension 55. The cylindrical extension 61 locates the spring 15 and holds same in position. A central bore 63 is provided in the cylindrical section 61 to define a guiding surface for the lower portion of the main valve member 14. The lower portion of the main valve member 14 comprises a hollow cylindrical poppet nozzle 65 extending upwardly from an inverted poppet cup 67. A thin cylindrical wall joins the lower surface of the poppet ring 33 to the upper surface of the poppet cup 67 such that the poppet ring 33 and the poppet nozzle 65 and the poppet cup 67 are an integral piece. A plurality of openings 71 are provided in the cylindrical wall 69 to provide communication between the outlet passage 13 and the space defined by the cylindrical wall 69. The outer surface of the poppet cup 67 is slideably sealed to the inner surface of the passage or bore 63 by a suitable annular seal 73.

In the absence of control signal pressures, the outlet passage 13 is vented to the vent passage 53 through the openings 71 and the poppet nozzle 65 and poppet cup 67. In order to close the venting prior to unblocking the outlet passage 13 from the inlet passage 12, a poppet valve member 75 is provided. The poppet valve member 75 comprises a vent poppet ring 77 of larger inner diameter than the outer diameter of the vent poppet nozzle 65. The ring 77 is shaped to contain and retain a disc-shaped seal 79. In order to move the poppet valve member 75 down so that the seal 79 is held against the top of the vent poppet nozzle 65, a piston 81 is secured to the vent poppet ring 77. The piston 81 projects into a cylinder 83 formed in the lower end of the upper portion 43 of the main valve member 14. An annular sliding seal 85 is provided between the outer wall of the piston 81 and the inner wall of the cylinder 83.

As will be explained, a control signal pressure introduced at the upper surface of the piston 81 moves the piston downwardly, causing the seal 79 to be held against the upper end of the vent poppet nozzle 65. Accordingly, the vent passage 53 is blocked from the outlet passage 13, closing the venting thereof. The control signal pressure required to do this overcomes the bias of a coil spring 87. The coil spring 87 seats on the upper surface of the inverted vent poppet cup 67 and in a suitable annular recess on the underside of the vent poppet ring 77.

The housing 11 is provided with a flanged upper extension 91 having a central bore 93 therein in which the piston 17 travels. The piston 17 is sealed within the cylinder or bore 93 by a suitable annular seal 95. The piston 17 is provided with a central opening 97 therein in which a valve stem 99 is secured, sealed by an annular seal 101. The valve stem 99 is provided with a central passage 103 therein and the valve stem 47 is provided with a central passage 105 therein. A piston 16 is secured to the upper valve stem 99 and constitutes the means responsive to a first control signal pressure for moving the main valve member 14 a preselected distance to partially unblock the inlet passage 12 from the outlet passage 13. This is explained more fully below. The passage 103 extends through the piston 16, thereby causing the region above the piston 16 to communicate with the region above the poppet piston 81. A nut 107 is threaded on the upper end of the valve stem 99 above the piston 17. As the valve stem 99 is able to slide within the opening 97 in the piston 17, the distance between the piston 16 and the piston 17 may be varied by suitably adjusting the nut 107. The nut 107 is retained in place by a suitable lock ring 109, surrounding the threaded upper section of the valve stem 99.

The cylinder 93 is extended upwardly by a further cylinder 111 defined by a cylindrical extension 113. The cylindrical extension 113 is mounted on the top of the extension 99 of the housing 11 by a top plate 115. The top plate 115 is bolted to the extension 91 by a plurality of bolts 117. Annular seals 119 and 121 are provided at the upper and lower ends of the cylindrical extension 113 to seal the cylinder 111. The piston 16 is sealed to the inner wall of the cylinder 111 by a suitable annular seal 123. The lower limit of travel of the piston 16 within the cylinder 111 is fixed by a stop ring 125 secured in a suitable recess in the wall of the cylinder 111.

In order to provide the control signal pressures, previously mentioned, threaded openings 127 and 129 are provided in the upper plate 115 and the cylindrical extension 113, respectively. The passage 127 communicates with the region above the cylinder 16 through a passage 131. The passage 129 communicates with the region above the piston 17 and below the piston 16 through a passage 133. The passage 127 is connected to a suitable source, not shown, of a first pilot or control signal pressure, and the passage 129 is connected to a suitable source, not shown, of a second pilot or control signal pressure. The second source may be joined to the first source through a suitable time delay network, known in the art.

As previously mentioned, the valve is illustrated in the shut off position with the inlet passage 12 blocked from the outlet passage 13 and with the outlet passage vented. When a pilot pressure or first control signal pressure is applied through the opening 127 and the passage 131 to the region above the cylinder 16, this pressure builds up through the passage 103 and the passage 105 and is applied to the top of the piston 81. The bias provided by the spring 87 is less than the bias provided by the spring 15, causing the piston 81 to be displaced before the piston 16. The piston 81 moves downwardly, pressing the seal 79 against the upper end of the vent poppet nozzle 65. This blocks the venting of the outlet passage 13.

As the pressure builds up from the first control pressure signal, the piston 16 moves downwardly against the bias of the spring 15. The vent remains closed. As the piston 16 moves downwardly, the nut 107 bears against the upper surface of the piston 17 and moves the piston 17 downwardly as well. This moves the main valve member 14 downwardly against the bias of the spring 15, opening the orifice 31 to allow flow between the inlet passage 12 and the outlet passage 13. Downward movement continues until the upper piston 16 engages the annular stop 125. The position of the stop 125 is preselected, and the adjustment of the nut 107 is such as to provide a predetermined degree of opening of the orifice 31, and a predetermined flow rate between the inlet passage 12 and the outlet passage 13. This flow rate is selected according to the needs of the system, such as limited or throttled flow needed during start up of a natural gas engine.

The second pilot signal or control signal pressure is applied through the passage 129 and the passage 133 to the region above the cylinder 17 and below the cylinder 16. Upon the second control signal pressure reaching a level sufficient to overcome the bias of the spring 15, the piston 17 moves downwardly relative to the piston 16, due to the sliding engagement of the valve stem 97 within the piston 17. This causes the main valve member 14 to move downwardly still farther, opening the orifice 31 to full design flow between the inlet passage 12 and the outlet passage 13.

The illustrated valve assembly has been described in connection with start up of natural gas engines. In addition, valves constructed in accordance with the invention may be utilized in the control of a starting motor to allow gear engagement before full torque is applied. Other uses will be apparent to those skilled in the art. For use in natural gas engines, maximum pilot pressure may be, for example, 100 psi, whereas the minimum may be in the range of 25-40 psi. Maximum line pressures may be in accordance with the valve housing material and the end connection specifications.

It may therefore be seen that the invention provides an improved valve assembly. More particularly, the invention provides an improved shut off valve of the block and vent type in which a unique two step opening feature is provided. A first pilot signal closes the vent and then opens the valve a preadjusted amount. A second signal from another source or from a suitable time delay network opens the valve fully. The valve has particular application in connection with natural gas engines and for air start motor control. In particular, the invention saves the cost of installation of a second valve or regulator in series with the block and vent valves in many applications.

Various modifications of the invention in addition to those shown and described herein will become apparent to those skilled in the art from the foregoing description and accompanying drawings. Such modifications are intended to fall within the scope of the appended claims.

What is claimed is:

1. A valve assembly comprising, a valve body defining an inlet passage and an outlet passage, a main valve member and main bias means for retaining said main valve member in a position blocking said inlet passage from said outlet passage, a first piston and means limiting movement thereof to a preselected distance, said first piston being responsive to a first control signal pressure for moving said main valve member a preselected distance to partially unblock said inlet passage from said outlet passage, a second piston connected to said main valve member and having an opening therein, a piston rod extending from said first piston through said opening in said second piston to be slidable therein, an adjustable stop on said rod for engaging said second piston to move same with said first piston, and for allowing said second piston to continue to move in the same direction when said first piston has stopped, said second piston being responsive to a second control signal pressure to move said main valve member to a position whereat said inlet passage is fully unblocked from said outlet passage.

2. A valve assembly comprising a valve body defining an inlet passage and an outlet passage, a main valve member and main bias means for retaining said main valve member in a position blocking said inlet passage from said outlet passage, a first piston responsive to a first control signal pressure for moving said main valve member a preselected distance to partially unblock said inlet passage from said outlet passage, a second piston connected to said main valve member and responsive to a second control signal pressure to move said main valve member to a position whereat said inlet passage is fully unblocked from said outlet passage, said second piston having an opening therein, said first piston having a piston rod extending therefrom through said opening in said second piston to be slidable therein, an adjustable stop on said rod for engaging said second piston to move same with said first piston and for allowing said second piston to continue to move in the same direction when said first piston has stopped, and a fixed stop provided for limiting movement of said first piston to a preselected distance.

* * * * *